US010083324B1

(12) United States Patent
Totale et al.

(10) Patent No.: US 10,083,324 B1
(45) Date of Patent: *Sep. 25, 2018

(54) QUALIFIED WEB APPLICATION SECURITY BASED ON MULTI-LAYERED EVALUATION OF WEB APPLICATION HIERARCHY

(71) Applicant: EMC Corporation, Hopkinton, MA (US)

(72) Inventors: Sachin G Totale, Pleasanton, CA (US); Pawel Zieminski, Pleasanton, CA (US); Julian Hjortshoj, San Francisco, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/072,639

(22) Filed: Mar. 17, 2016

(51) Int. Cl.
*G06F 21/62* (2013.01)
*H04L 29/06* (2006.01)

(52) U.S. Cl.
CPC .......... *G06F 21/629* (2013.01); *H04L 63/102* (2013.01); *H04L 63/205* (2013.01)

(58) Field of Classification Search
CPC ...... G06F 21/10; G06F 21/31; G06F 21/6218; G06F 2221/2141; H04L 63/102
USPC ........................................................ 726/28
See application file for complete search history.

(56) References Cited

U.S. PATENT DOCUMENTS

2006/0242183 A1* 10/2006 Niyogi ................ G06F 9/44505
2014/0025949 A1*  1/2014 Kay ..................... H04L 63/0428
                                                                 713/168

* cited by examiner

*Primary Examiner* — Evans Desrosiers
(74) *Attorney, Agent, or Firm* — Dergosits & Noah LLP; Todd A. Noah

(57) ABSTRACT

Qualified web application security based on multi-layered evaluation of web application hierarchy is described. A system receives a web application login request from a web browser associated with a user device. The system identifies a portion of qualified user information associated with the user device. The system creates an executable file based on using the portion of the qualified user information to evaluate a web application hierarchy file comprising hierarchical nodes, wherein each of the hierarchical nodes is associated with a corresponding web application function, at least one corresponding business rule, and a corresponding scope-based security configuration. The system sends the executable file to the web browser, thereby enabling the web browser to use another portion of the qualified user information to evaluate the executable file and to execute the evaluated executable file to provide qualified web application security for web application access requests from the user device.

18 Claims, 12 Drawing Sheets

- User — 306
  - Authentication
    - Login
    - Logout
  - Preferences — 304
    - View
    - Edit
    - Reset — 302
  - Profile — 310
    - Create
    - View
    - Edit
    - Delete — 308
- Tasks — 322
  - Task List — 320
    - Summary — 324
    - Detailed — 326
  - View
  - Edit
  - Actions
    - Accept
    - Reject
  - Comments
- Document — 314
  - Create
  - Import — 312
    - Bulk — 316
    - Single — 318
  - View
  - Edit
  - Download
  - Comments
  - Versions
    - Listing
    - Delete
- Audit Trail
  - User
  - Document
  - Task
- Search
  - Document

- User                                                                400
  - Authentication
    - Login
    - Logout
  - Preferences — 412
    - View
    - Edit
    - Reset (only Administrator) — 410
  - Profile — 408
    - Create (only Administrator)
    - View
    - Edit
    - Delete (only Administrator) — 406
- Tasks (all but Administrator)
  - Task List (all but Administrator)
    - Summary (all but Administrator)
    - Detailed (all but Administrator) — 404
  - View (all but Administrator)
  - Edit (only Reviewer and Approver)
  - Actions (all but Administrator)
    - Accept (all but Administrator)
    - Reject (only Reviewer and Approver)
  - Comments (all but Administrator)
- Document (all but Administrator)
  - Create
  - Import — 402
    - Bulk
    - Single
  - View (all but Administrator)
  - Edit (only Reviewer and Approver)
  - Download (all but Administrator)
  - Comments (all but Administrator)
  - Versions (all but Administrator)
    - Listing (all but Administrator)
    - Delete (only Reviewer and Approver)
- Audit Trail (all but Administrator)
  - User (only Reviewer and Approver)
  - Document (all but Administrator)
  - Task (all but Administrator)
- Search
  - Document

FIG. 4

- User
  - Authentication
    - Login
    - Logout
  - Preferences
    - View
    - Edit
    - Reset (only Sliver and Gold Plans)
  - Profile
    - Create
    - View
    - Edit
    - Delete
- Tasks
  - Task List
    - Summary
    - Detailed (only Sliver and Gold Plans) — 504
  - View
  - Edit
  - Actions
    - Accept
    - Reject
  - Comments (only Sliver and Gold Plans)
- Document
  - Create
  - Import — 502
    - Bulk
    - Single
  - View
  - Edit
  - Download (only Sliver and Gold Plans)
  - Comments (only Sliver and Gold Plans)
  - Versions (only Gold Plan)
    - Listing (only Gold Plan)
    - Delete (only Gold Plan)
- Audit Trail
  - User (only Gold Plan)
  - Document (only Sliver and Gold Plans)
  - Task (only Sliver and Gold Plans)
- Search
  - Document

- User
    - Authentication
        - Login
        - Logout
    - Preferences
        - View
        - Edit
        - Reset
    - Profile (Large)
        - Create (Large)
        - View (Large)
        - Edit (Large)
        - Delete (Large)
- Tasks
    - Task List — 608
        - Summary (Small or Medium) — 610
        - Detailed (Large) — 612
    - View
    - Edit
    - Actions
        - Accept
        - Reject
    - Comments (Large)
- Document
    - Create
    - Import — 602
        - Bulk (Large) — 604
        - Single (Small or Medium) — 606
    - View
    - Edit (Medium or Large)
    - Download (Medium or Large)
    - Comments
    - Versions
        - Listing
        - Delete
- Audit Trail
    - User
    - Document
    - Task
- Search
    - Document

600

FIG. 6

```
    "qualifiers": {
        "roles": {
            "evaluation": "server",
            "effective": "session"
        },
        "InheritedFrom": {
            "evaluation": "both",
            "effective": "always"
        },
        "users": {
            "evaluation": "server",
            "effective": "session"
        },
        "devices": {
            "evaluation": "server",
            "effective": "session"
        },
        "env": {
            "evaluation": "server",
            "effective": "application"
        },
        "linkRel": {
            "evaluation": "browser",
            "effective": "instance"
        },
        "businessServiceType": {
            "evaluation": "browser",
            "effective": "session"
        },
        "businessServiceVersion": {
            "evaluation": "browser",
            "effective": "session"
        }
    }
}
```

702 points to the "roles" block.

FIG. 7

User Details:

Role: author  Subscription Tier: Basic  Media Size: Large (Desktop PC)

- User
    - Authentication
        - Login
        - Logout
    - Preferences
        - View
        - Edit
    - Profile (Large)
        - View (Large)
        - Edit (Large)
- Tasks
    - Task List
        - Summary (Small or Medium)
    - View
    - Edit
    - Actions
        - Accept
- Document
    - Create
    - Import — 802
        - Bulk (Large) — 804
        - Single (Small or Medium) — 806
    - View
    - Download (Medium or Large)
- Search
    - Document

User Details:

Role: author  Subscription Tier: Basic  Media Size: Large (Desktop PC)

- User
    - Authentication
        - Login
        - Logout
    - Preferences
        - View
        - Edit
    - Profile
        - View
        - Edit
- Tasks
    - View
    - Edit
    - Actions
        - Accept
- Document
    - Create
    - Import — 902
        - Bulk ) — 904
    - View
    - Download
- Search
    - Document

User Details:

Role: Approver  Subscription Tier: Gold   Media Size: Small (Mobile Device)

- User
  - Authentication
    - Login
    - Logout
  - Preferences
    - View
    - Edit
- Tasks
  - Task List
    - Summary — 1106
  - View
  - Edit
  - Actions
    - Accept
    - Reject
- Document
  - Create
  - Import — 1102
    - Single — 1104
  - View
  - Comments
  - Versions
    - Listing
    - Delete
- Audit Trail
  - User
  - Document
  - Task
- Search
  - Document
  - User
  - Save

FIG. 11

QUALIFIED WEB APPLICATION SECURITY BASED ON MULTI-LAYERED EVALUATION OF WEB APPLICATION HIERARCHY

BACKGROUND

Typically, web application security uses various restrictions and business rules to determine what type of user privileges are required to access various functionalities of a web application. Web application security may be based on various qualifiers, such as a user's assigned role, a user's subscription, a user's device, a user's geographic location, a user's profile, the time of a user's access request, the version of the web application, the client-server environment, the user-requested functionality, the user's service agreement, and the user's tenant in a multi-tenant database system. Traditionally, web application security is a configurable part of implementing a web application. Each web application functionality needs to be configured in a web application security configuration. Any change to a web application's business rules or security needs to be carefully reconfigured to insure that any change is handled properly in each and every part of the web application. When new web application functionalities are added to a web application, corresponding security configurations also need to be added. These requirements may become challenging for cloud-based enterprise software-as-a-service solutions, as each tenant (typically an enterprise company) needs to configure the software-as-a-service based web application security as per the tenant's business practices and type of services.

BRIEF DESCRIPTION OF THE DRAWINGS

FIG. 4 is an example web application hierarchy based on role-based access to available functionalities per a business use case, under an embodiment;

FIG. 5 is an example web application hierarchy based on subscription-based access to available functionalities per a business use case, under an embodiment;

FIG. 6 is an example web application hierarchy based on media size-based access to available functionalities per a business use case, under an embodiment;

FIG. 7 is an example of qualifier metadata depicting properties of scope metadata for a web application hierarchy, under an embodiment;

FIG. 8 is an example of a server-evaluated qualified web application hierarchy, under an embodiment;

FIG. 9 is an example of a browser-evaluated qualified web application hierarchy, under an embodiment;

FIG. 11 is another example of a browser-evaluated web application hierarchy, under an embodiment.

DETAILED DESCRIPTION

Figure 1:
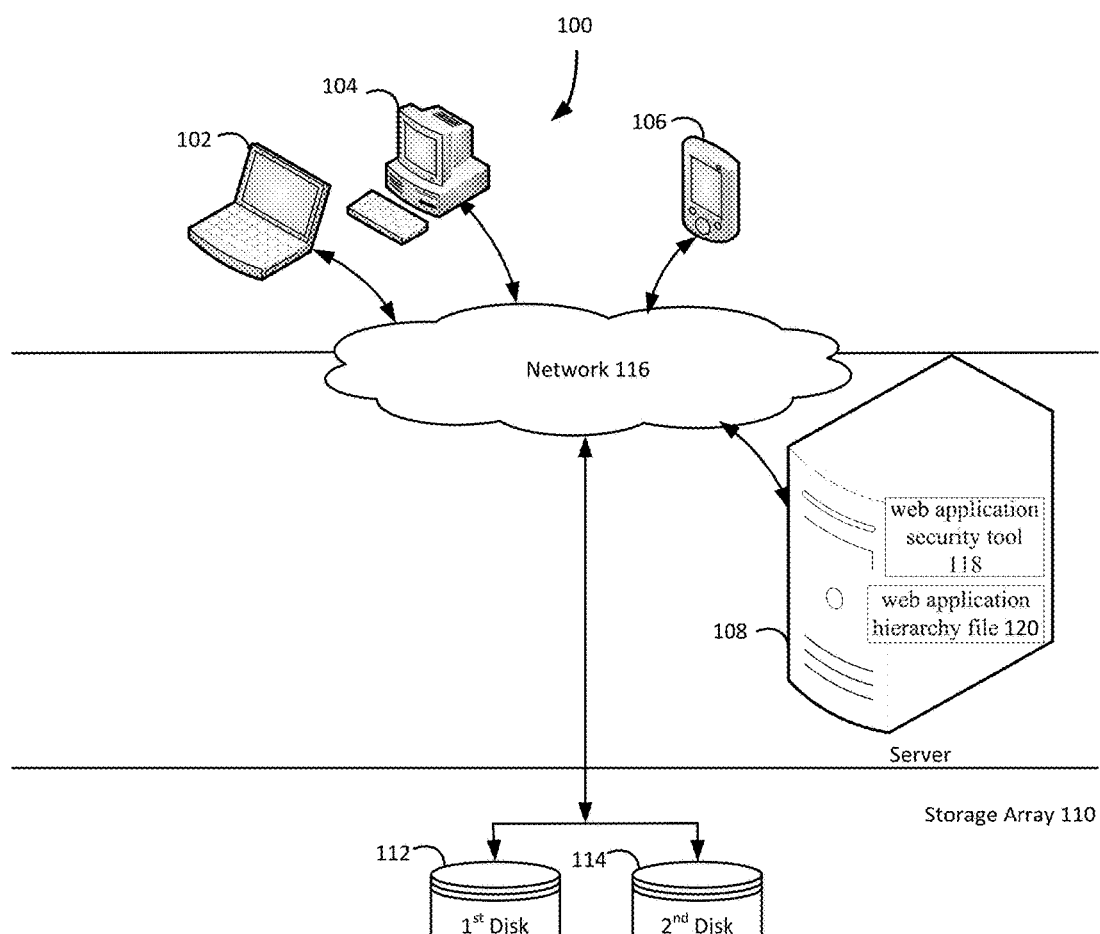
FIG. 1 illustrates a block diagram of an example system for qualified web application security based on web application hierarchy, under an embodiment.

The configurations of a web application may be defined through markup languages, such as Extensible Markup Language (XML®) or JavaScript® Object Notation (JSON). These configurations can be generic and applicable in all circumstances, or qualified for a set of conditions, such that the corresponding part of a configuration varies whenever a specified condition arises. A qualified configuration may be defined through a scope element or object which contains a set of qualifiers and the expected condition or value associated with each configured qualifier. The following example depicts a scope defined in a configuration block:

```
{
  "id": "columbo.business_service_client",
  "buildDependencies": ["colombo.common"],
  "$scope": {
  "device": "mobile",
  "role":"reviewer"
},
```

Before such a configuration is consumable, the scoped section of the configuration needs to be evaluated, and then only the applicable scoped section is merged with the overall configuration and applied in the web application business logic. Some of the web application business logic may reside in a server layer while the remainder of the web application business logic may reside in a client layer or browser layer. Due to this complexity, some qualifiers are best evaluated in the server layer of a web application while other qualifiers are expected to be evaluated in the browser layer.

Embodiments herein provide qualified web application security based on multi-layered evaluation of web application hierarchy. A system receives a web application login request from a web browser associated with a user device. The system identifies a portion of qualified user information associated with the user device. The system creates an executable file based on using the portion of the qualified user information to evaluate a web application hierarchy file which includes hierarchical nodes which are associated with corresponding web application functions, corresponding business rules, and corresponding scope-based security configurations. The system sends the executable file to the web browser, which enables the web browser to use another portion of the qualified user information to evaluate the executable file and to execute the evaluated executable file to provide qualified web application security for web application access requests from the user device.

For example, a web application security tool receives a request to login to a document task management business application from a user via a desktop personal computer. The web application security tool identifies that the user is assigned an author role. The web application security tool uses the author role to evaluate the corresponding business rules and the corresponding scope-based security configurations for the hierarchical nodes in a web application hierarchy file to create a qualified web application hierarchy file. The qualified web application hierarchy file specifies that the user has access to a functionality to import documents because the business rules specify that this import document functionality is available for users associated with the author role, and this import document functionality includes a bulk import document functionality for user devices with a large media size and also includes a single import document functionality for user devices with a small or medium media size. The web application security tool creates an executable file based on the qualified web application hierarchy file, and sends the executable file to the desktop personal computer's web browser, which uses the large media size of the desktop personal computer to evaluate the executable file as providing the bulk import document functionality. The desktop personal computer's web browser executes this evaluated executable file to provide the user with access to the document task management business application's functionality to bulk import documents.

The web application security tool enables the definition of web application configuration scopes which are applicable at the server layer and the browser layer of a web application, which enables the progressive evaluation of web application configuration scopes. Qualifiers are used together instead of splitting the various web application configurations based on their applicability or evaluation criteria. A well-defined time to evaluate a scope optimizes the scope evaluation schemes. The web application security tool enables the transparent handling of progressive scope evaluation, and efficient configuration of a multi-layered web application configuration.

Prior to describing the subject matter in detail, an exemplary hardware system in which the subject matter may be implemented is described. Those of ordinary skill in the art will appreciate that the elements illustrated in FIG. 1 may vary depending on the system implementation. FIG. 1 illustrates a diagram of a system that implements qualified web application security based on multi-layered evaluation of web application hierarchy, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer. The storage array 110 includes a first disk 112 and a second disk 114. The clients 102-106, the server 108, and the storage array 110 communicate via a network 116. The server 108 includes a web application security tool 118 which accesses a web application hierarchy file 120 in the server 108 to provide qualified web application security based on multi-layered evaluation of web application hierarchy, as described below.

Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 1200 depicted in FIG. 12 and described below.

Figure 2:
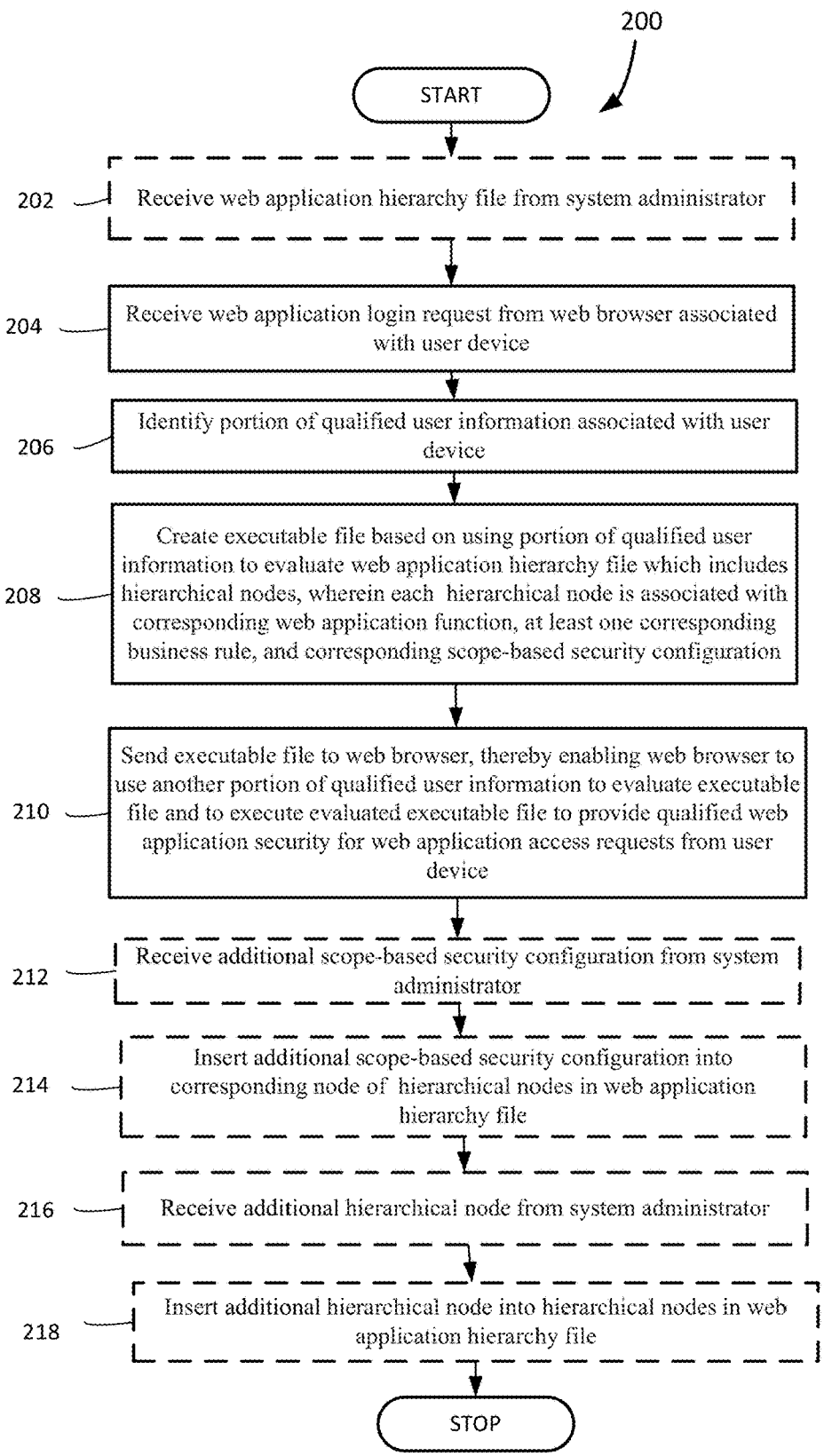
FIG. 2 is an example flow chart illustrating a process for qualified web application security based on multi-layered evaluation of web application hierarchy, under an embodiment.

FIG. 2 is a flowchart that illustrates a method for qualified web application security based on multi-layered evaluation of web application hierarchy, under an embodiment. Flowchart 200 illustrates method acts illustrated as flowchart blocks for certain steps involved in and/or between the clients 102-106 and/or the server 108 of FIG. 1.

Figure 3:
FIG. 3 is an example web application hierarchy based on available functionalities per a business use case, under an embodiment.

A web application hierarchy file is optionally received from a system administrator, block 202. For example, a system administrator sends the web application hierarchy file 120 for a document task management business application to the web application security tool 118. In this example, the document task management business application manages end-user tasks, enables end-users to perform various actions on assigned tasks associated with business documents, and maintains an audit trail of all actions performed on the tasks and the documents. The web application hierarchy file 120 may be organized in any logical manner, such as based on folders, configurations, or data. Although this example describes the web application hierarchy file 120 for the document task management business application, the web application hierarchy the 120 may be for any type of web application. An example of a web application hierarchy 300 based on the document task management business application is depicted in FIG. 3 and described below in reference to FIG. 3. Access to the functionalities represented by the web application hierarchy file 120 may be based on a user's role, the user's subscription, the user's device, the user's location, the user's profile, a time of the user's access request, a version of the web application, a client-server environment, the user's requested functionality, the user's service agreement, and/or the user's tenant in a multi-tenant database system. An example of a web application hierarchy 400 based on role-based access to the document task management business application is depicted in FIG. 4 and described below in reference to FIG. 4. An example of a web application hierarchy 500 based on subscription-based access to the document task management business application is depicted in FIG. 5 and described below in reference to FIG. 5. An example of a web application hierarchy 600 based on media size-based access to the document task management business application is depicted in FIG. 6 and described below in reference to FIG. 6. An example of qualifier metadata 700 depicting properties of scope metadata for a web application hierarchy is depicted in FIG. 7 and described below in reference to FIG. 7.

After receiving a web application hierarchy file, a web application login request for the corresponding web application is subsequently received from a web browser associated with a user device, block 204. For example, the web application security tool 118 receives a request to login to the document task management business application from a user via the desktop personal computer 104. In another example, the web application security tool 118 receives another request to login to the document task management business application from another user via the mobile device 106.

Having received a request from a user device, a portion of qualified user information associated with the user device is identified, block 206. For example, the web application security tool 118 identifies that the user who is requesting to login via the desktop personal computer 104 is assigned an author role and is an employee of an employer which is subscribed via a basic subscription. In another example, the web application security tool 118 identifies that the user who is requesting to login via the mobile device 106 is assigned an approver role and is an employee of an employer which is subscribed via a premium subscription. Although these examples describe a portion of the qualified user information based on a user role and a subscription, the portion of the qualified user information may be based on a user's role, the user's subscription, the user's device, the user's location, the user's profile, a time of the user's access request, a version of the web application, a client-server environment, the user's requested functionality, the user's service agreement, and/or the user's tenant in a multi-tenant database system. The web application security tool 118 may also use the time of the user's access request, such as the time of day, the day of a week or a month, or the month in a year, as qualified user information.

After identifying a portion of the qualified user information, an executable file is created based on using the portion of the qualified user information to evaluate a web application hierarchy file which includes hierarchical nodes, wherein each hierarchical node is associated with a corresponding web application function, at least one corresponding business rule, and a corresponding scope-based security configuration, block 208. For example, the web application security tool 118 uses the portion of the qualified user information specifying the author role and the basic subscription to evaluate the corresponding business rules and the corresponding scope-based security configurations for the web application hierarchy file 120 to create a qualified web application hierarchy file. An example qualified web application hierarchy 800 based on an author role and a basic subscription is depicted in FIG. 8 and described below in reference to FIG. 8. This qualified web application hierarchy file 800 specifies that the corresponding user has access to a functionality to import documents 802 because the business rules 402 and 502 depicted in FIG. 4 and FIG. 5 specify that this import documents functionality is available for users associated with the author role and a basic subscription. This qualified web application hierarchy file 800 also specifies that the functionality to import documents 802 includes a bulk import document functionality 804 for user devices with a large media, size and also includes a single import document functionality 806 for user devices with a small or medium media size. However, this qualified web application hierarchy file 800 does not specify that the corresponding user has access to a functionality of a detailed task list because the business rules 404 and 504 depicted in FIG. 4 and FIG. 5 specify that this detailed task list functionality is not available for users associated with the author role and a basic subscription. Then the web application security tool 118 creates an executable file based on the qualified web application hierarchy file 700 which is based on the qualified user information specifying the author role and the basic subscription, but which is not yet evaluated for media size.

Figure 10:
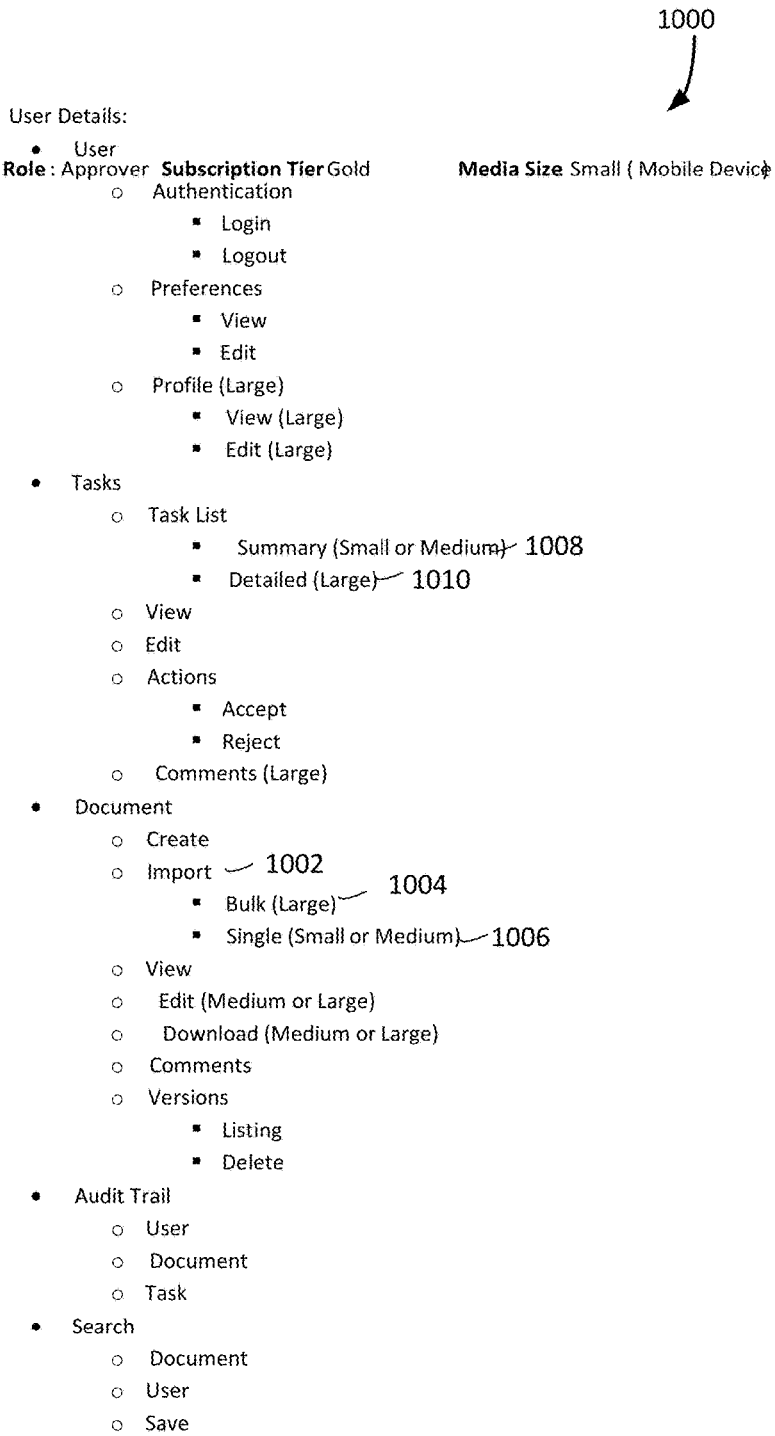
FIG. 10 is another example of a server-evaluated qualified web application hierarchy, under an embodiment.

In another example, the web application security tool 118 uses the portion of the qualified user information specifying the approver role and the premium subscription to evaluate the corresponding business rules and the corresponding scope-based security configurations for the web application hierarchy file 120 to create another qualified web application hierarchy file. An example qualified web application hierarchy 1000 based on an approver role and a premium subscription is depicted in FIG. 10 and described below in reference to FIG. 110. This qualified web application hierarchy file 1000 specifies that the corresponding user also has access to the functionality to import documents 1002 because the business rules 402 and 502 depicted in FIG. 4 and FIG. 5 specify that this import documents functionality is available for users associated with the approver role and a premium subscription. This qualified web application hierarchy file 1000 also specifies that the functionality to import documents 1002 includes a bulk import document functionality 1004 for user devices with a large media size and also includes a single import document functionality 1006 for user devices with a small or medium media size. Additionally, this qualified web application hierarchy file 1000 specifies that the corresponding user also has access to a functionality of a summary task list 1008 if the user device has a small or medium media size because the business rules 404 and 504 depicted in FIG. 4 and FIG. 5 specify that this detailed task list functionality 1010 is available for users associated with the approver role, a premium subscription, and a small or medium media size. Furthermore, this qualified web application hierarchy file 1000 specifies that the corresponding user also has access to a functionality of a detailed task list 1010 if the user device has a large media size because the business rules 404 and 504 depicted in FIG. 4 and FIG. 5 specify that this detailed task list functionality 1010 is available for users associated with the approver role, a premium subscription, and a large media size. Then the web application security tool 118 creates another executable file based on the qualified web application hierarchy file 1000 which is based on the qualified user information specifying the approver role and the premium subscription, but which is not yet evaluated for media size.

A web application is able to use a well-defined identifier for each node in the web application hierarchy 120 in a manner similar to the selection of Cascading Style Sheets (CSS) in Hyper Text Markup Language (HTML) Domain Object Models (DOM) to hide/show or skip/render the corresponding portion of the HTML code. This mechanism also enables application developers to have a clear separation of application security from core application business logic.

Having created an executable file, the executable file is sent to a web browser, thereby enabling the web browser to use another portion of the qualified user information to evaluate the executable file and to execute the evaluated executable file to provide qualified web application security for web application access requests from the user device, block 210. For example, the web application security tool 118 sends the executable file based on the qualified web application hierarchy file 800 which is based on the qualified user information specifying the author role and the basic subscription to the web browser of the desktop personal computer 104. The web browser of the desktop personal computer 104 uses the large media size of the desktop personal computer 104 to evaluate the executable file based on the qualified web application hierarchy file 800 as providing the bulk import document functionality 804. The web application security tool 118 may use the type of the requesting user device, including screen orientation, browser type, and language, as qualified user information as the other portion of the qualified user information. The web application security tool 118 may use the other portion of the qualified user information to change the page layout and content displayed, adjust user navigation, and/or make some functionalities unavailable for user devices with relatively smaller display screens. Although this example describes the web browser using media size to evaluate an executable file, the web browser may use any other portion of the qualified user information to evaluate the executable file, such as a user's role, the user's subscription, the user's device, the user's location, the user's profile, a time of the user's access request, a version of the web application, a client-server environment, the user's requested functionality, the user's service agreement, and/or the user's tenant in a multi-tenant database system. When the web browser of the desktop personal computer 104 executes this evaluated executable file, this web browser provides the corresponding user with access to the document task management business application's functionality to bulk import documents 804, but does not provide the corresponding user with access to the document task management business application's functionality of a detailed task list.

In another example, the web application security tool 118 sends the executable file based on the qualified web application hierarchy file 1000 which is based on the qualified user information specifying the approver role and the premium subscription to the web browser of the mobile device 106. The web browser of the mobile device 106 uses the small media size of the mobile device 106 to evaluate the executable file based on the qualified web application hierarchy file 1000 as providing the single import document functionality 1006 and the summary task list functionality 1008. When the web browser of the mobile device 106 executes this evaluated executable file, this web browser provides the corresponding user with access to the document task management business application's functionality to single import documents 1006 and to the document task management business application's functionality of a summary task list 1008.

After enabling qualified web application security, an additional scope-based security configuration is optionally received from a system administrator, block 212. For example, a system administrator submits an additional security configuration and business rule for the previously existing functionality to delete a user profile 406, wherein this additional security configuration is scoped for access by the system administrator, as depicted in FIG. 4, because too many users have inadvertently deleted their user profile. This previously existing functionality to delete a user profile 406 had been previously associated with the security configuration for user profiles, which was inherited from the user profile parent node 408 for the user profile delete child node 406, and which was scoped for access by the corresponding user, as depicted in FIG. 4. The structure of the web application hierarchy 120 enabled the user profile delete child node 406 to inherit a default security configuration from the user profile parent node 408 without requiring any system administrator to individually configure the security configuration for the user profile delete child node 406. Similarly, any changes to business rules and/or security configuration for a node is automatically inherited as default values by the node's descendent nodes unless explicitly specified otherwise.

Having received an additional scope-based security configuration, the additional scope-based security configuration is optionally inserted into a corresponding hierarchical node in a web application hierarchy file, block 214. For example, the web application security tool 118 inserts this additional security configuration for the functionality to delete a user profile, scoped for access by the system administrator, into the user profile delete node 406 of the example web application hierarchy file 400, as depicted in FIG. 4. Continuing this example, any subsequent login requests result in web browsers executing executable files which provide access only to the system administrator to the functionality to delete a user profile 406. The web application security tool 118 enables the system administrator to transparently inject additional security into a group of functionalities in the web application hierarchy 120. The structure of the web application hierarchy 120 enables a system administrator to set the security for a group of functionalities based on a common security configuration set at an ancestor node, such that a system administrator can set security for a web application without a great amount of detailed technical knowledge.

After enabling qualified web application security, an additional hierarchical node is optionally received from a system administrator, block 216. For example, a system administrator submits an additional node for an additional functionality to reset a user's preferences, wherein the corresponding security configuration is scoped for access by the system administrator, because many users have requested the system administratorheir user preferences.

Having received an additional hierarchical node, the additional hierarchical node is optionally inserted into the hierarchical nodes in a web application hierarchy file, block 218. For example, the web application security tool 118 inserts this additional node for the functionality to reset a user preference, scoped for access by the system administrator, as a user preferences reset child node 410 for the user preferences parent node 412 in the example web application hierarchy file 400, as depicted in FIG. 4. Continuing this example, a system administrator can respond to any subsequent requests to reset user preferences by logging into the document task management business application, which results in the system administrator's web browser executing an executable file which provides access to the functionality to reset a user preference 410. The structure of the web application hierarchy 120 enables any node added as a child node to inherit a default security configuration from the added node's parent node without requiring any system administrator to individually configure the security configuration for the added node. If the web application security tool 118 receives a request from a user administrator to add a child node for the user preferences reset node 410, this new child node would automatically inherit the default security configuration of its parent node 410 and only be accessible by the system administrator, unless explicitly specified otherwise. The structure of the web application hierarchy 120 enables the easy addition, deletion, and modification of functionalities, business rules, and security configurations through the addition, deletion, and modification of corresponding nodes.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

FIG. 3 is an example web application hierarchy 300 based on available functionalities per a business use case, under an embodiment. The example web application hierarchy 300 includes the node representing the functionality to reset user preferences 302, which is depicted as a child node of the user preferences parent node 304, which is depicted as a child node of the user parent node 306. The example web application hierarchy 300 also includes the node representing the functionality to delete a user profile 308, which is depicted as a child node of the user profile parent node 310, which is depicted as a child node of the user parent node 306. The example web application hierarchy 300 further includes the node representing the functionality to import a document 312, which is depicted as a child node of the document parent node 314. The functionality to import a document 312 includes the bulk import a document functionality 316 and the single import a document functionality 318, which are depicted as the child nodes 316 and 318 of the parent node 312. The example web application hierarchy 300 additionally includes the node representing the functionality for a task list 320, which is depicted as a child node of task parent node 322. The functionality for a task list 320 includes a summary of the task list functionality 324 and a detailed task list functionality 326, which are depicted as the child nodes 324 and 326 of the parent node 320.

FIG. 4 is an example web application hierarchy 400 based on role-based access to available functionalities per a business use case, under an embodiment. The document task management business application represented by the web application hierarchy 400 may have four user roles, such as an author, a reviewer, an approver, and a system administrator. More than one author may be associated with each reviewer, and more than one reviewer may be associated with each approver. The business rule 402 specifies that the functionality to import documents is available for all users, including users associated with the author role and users associated with the approver role. The business rule 404 specifies that the functionality of a detailed task list is available for users associated with the author role, the reviewer role, or the approver role, but is not available for users associated with the administrator role. The web application hierarchy 400 includes the node representing the functionality to delete a user profile 406, which is depicted as a child node of the user profile parent node 408, and the node representing the functionality to rest user preferences 410, which is depicted as a child node of the user preferences node 412. Although the business rules 404, 406, and 410 are depicted as annotations to their corresponding nodes, the business rules may be indicated in any manner.

FIG. 5 is an example web application hierarchy 500 based on subscription-based access to available functionalities per a business use case, under an embodiment. The document task management business application represented by the web application hierarchy 500 may have three subscription plans, such as a basic plan, a silver plan, and a gold plan. The business rule 502 specifies that the functionality to import documents is available for all users, including users associated with a basic subscription plan and for users associated with the premium silver and gold subscription plans. The business rule 504 specifies that the functionality of a detailed task list is not available for users associated with a basic subscription plan, but is available for users associated with the premium silver and gold subscription plans. Although the business rule 504 is depicted as annotations to their corresponding nodes, the business rules may be indicated in any manner.

FIG. 6 is an example web application hierarchy 600 based on media size-basedie access to available functionalities per a business use case, under an embodiment. The document task management business application represented by the web application hierarchy 600 may have three media sizes for user devices or clients, such as small, medium, and large. The business rule 602 specifies that the functionality to import documents is available for all media sizes, the business rule 604 specifies that the functionality to bulk import documents is available for only the large media size, and the business rule 606 specifies that the functionality to single import documents is available for the small media size and the medium media size. The business rule 608 specifies that the functionality of a task list is available for all media sizes, the business rule 610 specifies that the functionality of a summary of a task list is available for the small media size and the medium media size, and the business rule 612 specifies that the functionality of a detailed task list is available for only the large media size. Although the business rules 604, 606, 610, and 612 are depicted as annotations to their corresponding nodes, the business rules may be indicated in any manner.

FIG. 7 is an example of qualifier metadata 700 depicting properties of scope metadata for a web application hierarchy, under an embodiment. Each qualifier metadata may have an evaluation property and an effective property. The evaluation property specifies the application layer, such as the server or the browser, where the cope associated with this qualifier is evaluated. The effective property specifies the life cycle stage when the qualifier is applied. The application life cycle stage is during application startup, the session life cycle stage is during a user session creation or an application initialization in a browser, and the instance life cycle stage is when an associated object or user interface entity instance is loaded or refreshed. For example, the roles qualifier metadata 702 specifies that the scope of roles are evaluated at the server during a user session creation.

FIG. 8 is an example of a server-evaluated qualified web application hierarchy 800 based on an author role and a basic subscription, under an embodiment. This qualified web application hierarchy file 800 specifies that a corresponding user has access to the functionality to import documents 802 because the business rules 402 and 502 depicted in FIG. 4 and FIG. 5 specify that this import document functionality is available for users associated with the author role and a basic subscription. This qualified web application hierarchy file 800 also specifies that the corresponding user has access to the functionality for bulk import of documents 804 when using a user device with a large media size and has access to the functionality for single import of documents 806 when using a user device with a small media size or a medium media size. The business rules 402 and 502 depicted in FIG. 4 and FIG. 5 specify that these functionalities 804 and 806 are available for users associated with the author role and a basic subscription, depending upon the media size of the user device. Although the server created the qualified web application hierarchy file 800 by using the author role and a basic subscription to evaluate the web application hierarchy file 120, the server does not use the media size to evaluate the web application hierarchy file 120 because the user device's web browser is the best layer for scope evaluation based on the media size. Instead, the server sends the qualified web application hierarchy file 800 in the form of an executable file to the user device's web browser, which creates a browser-evaluated qualified web application hierarchy file by using the media size of the user device to evaluate the executable file created by the server's evaluation of the qualified web application hierarchy file 120. An example browser-evaluated qualified web application hierarchy 900 based on an author role, a basic subscription, and a large media size is depicted in FIG. 9 and described below in reference to FIG. 9.

FIG. 9 is an example of a browser-evaluated qualified web application hierarchy 900, based on an author role, a basic subscription, and a large media size, under an embodiment. A web browser provides the corresponding user with access to the document task management business application's functionality to import documents 902, but does not provide the corresponding user with access to the document task management business application's functionality of a detailed task list. This qualified web application hierarchy file 900 specifies that a corresponding user has access to the functionality to import documents 902 because the business rules 402 and 502 depicted in FIG. 4 and FIG. 5 specify that this import documents functionality is available for users associated with the author role, a basic subscription, and all media sizes. This qualified web application hierarchy file 900 also specifies that the corresponding user has access to the functionality for bulk import of documents 904 when using a user device with a large media size because the user device's web browser used the large media size to evaluate the executable file received from the server. However, this qualified web application hierarchy file 900 specifies that the corresponding user does not have access to the functionality for single import of documents when using a user device with a large media size because this single import functionality is reserved for a small media size or a medium media size, and the user device's web browser used the large media size to evaluate the executable file received from the server. The business rules 402 and 502 depicted in FIG. 4 and FIG. 5 specify that the functionalities 902 and 904 are available for users associated with the author role, a basic subscription, and a large media size. Having evaluated the executable file received from the server, the web browser executes the browser-evaluated executable file to provide the corresponding user with access to the document task management business application's functionality to import documents 902 and to the document task management business application's functionality to bulk import documents 904.

FIG. 10 is an example of a server-evaluated qualified web application hierarchy 1000 based on a reviewer role and a gold subscription, under an embodiment. This qualified web application hierarchy file 1000 specifies that a corresponding user has access to the functionality to import documents 1002 because the business rules 402 and 502 depicted in FIG. 4 and FIG. 5 specify that this import documents functionality is available for users associated with the approver role and a premium subscription. This qualified web application hierarchy file 1000 also specifies that the corresponding user has access to the functionality for bulk import of documents 1004 when using a user device with a large media size and has access to the functionality for single import of documents 1006 when using a user device with a small media size or a medium media size. The business rules 402 and 502 depicted in FIG. 4 and FIG. 5 specify that these functionalities 1004 and 1006 are available for users associated with the author role and a basic subscription, depending upon the media size of the user device. Additionally, this qualified web application hierarchy file 1000 also specifies that the corresponding user has access to the functionality for a summary of a task list 1008 when using a user device with a small media size or a medium media size and has access to the functionality for a detailed task list 1010 when using a user device with a large media size. The business rules 402 and 502 depicted in FIG. 4 and FIG. 5 specify that these functionalities 1008 and 1010 are available for users associated with the approver role and a premium subscription, depending upon the media size of the user device. Although the server created the qualified web application hierarchy file 1000 by using the approver role and a premium subscription to evaluate the web application hierarchy file 120, the server does not use the media size to evaluate the web application hierarchy file 120 because the user device's web browser is the best layer for scope evaluation based on the media size. Instead, the server sends the qualified web application hierarchy file 1000 in the form of an executable file to the user device's web browser, which create a browser-evaluated qualified web application hierarchy file by using the media size of the user device to evaluate the executable file created by the server's evaluation of the qualified web application hierarchy file 120. An example of a browser-evaluated qualified web application hierarchy 1100 based on an approver role, a premium subscription, and a small media size is depicted in FIG. 11 and described below in reference to FIG. 11.

FIG. 11 is an example of a browser-evaluated qualified web application hierarchy 1100, based on an approver role, a premium subscription, and a small media size, under an embodiment. A web browser provides the corresponding user with access to the document task management business application's functionality to import documents 1102, but does not provide the corresponding user with access to the document task management business application's functionality of a detailed task list. This qualified web application hierarchy file 1100 specifies that a corresponding user has access to the functionality to import documents 1102 because the business rules 402 and 502 depicted in FIG. 4 and FIG. 5 specify that this import documents functionality is available for users associated with the approver role, a premium subscription, and all media sizes. This qualified web application hierarchy file 1100 also specifies that the corresponding user has access to the functionality for single import of documents 1104 because this single import functionality is available for a small media size or a medium media size, and the user device's web browser used the small media size to evaluate the executable file received from the server. However, this qualified web application hierarchy file 1100 specifies that the corresponding user does not have access to the functionality for bulk import of documents because this single import functionality is reserved for a large media size, and the user device's web browser used the small media size to evaluate the executable file received from the server. The business rules 402 and 502 depicted in FIG. 4 and FIG. 5 specify that the functionalities 1102 and 1104 are available for users associated with the approver role, a premium subscription, and a small media size. This qualified web application hierarchy file 1100 further specifies that the corresponding user has access to the functionality for a summary of a task list 1106 because this summary task list functionality is available for a small media size or a medium media size, and the user device's web browser used the small media size to evaluate the executable file received from the server. However, this qualified web application hierarchy file 1100 specifies that the corresponding user does not have access to the functionality for a detailed task list because this detailed task list functionality is reserved for a large media size, and the user device's web browser used the small media size to evaluate the executable file received from the server. The business rules 402 and 502 depicted in FIG. 4 and FIG. 5 specify that the functionality 1106 is available for users associated with the approver role, a premium subscription, and a small media size. Having evaluated the executable file received from the server, the web browser executes the browser-evaluated executable file to provide the corresponding user with access to the document task management business application's functionality to single import documents 1104 and to the document task management business application's summary task list 1106.

Figure 12:
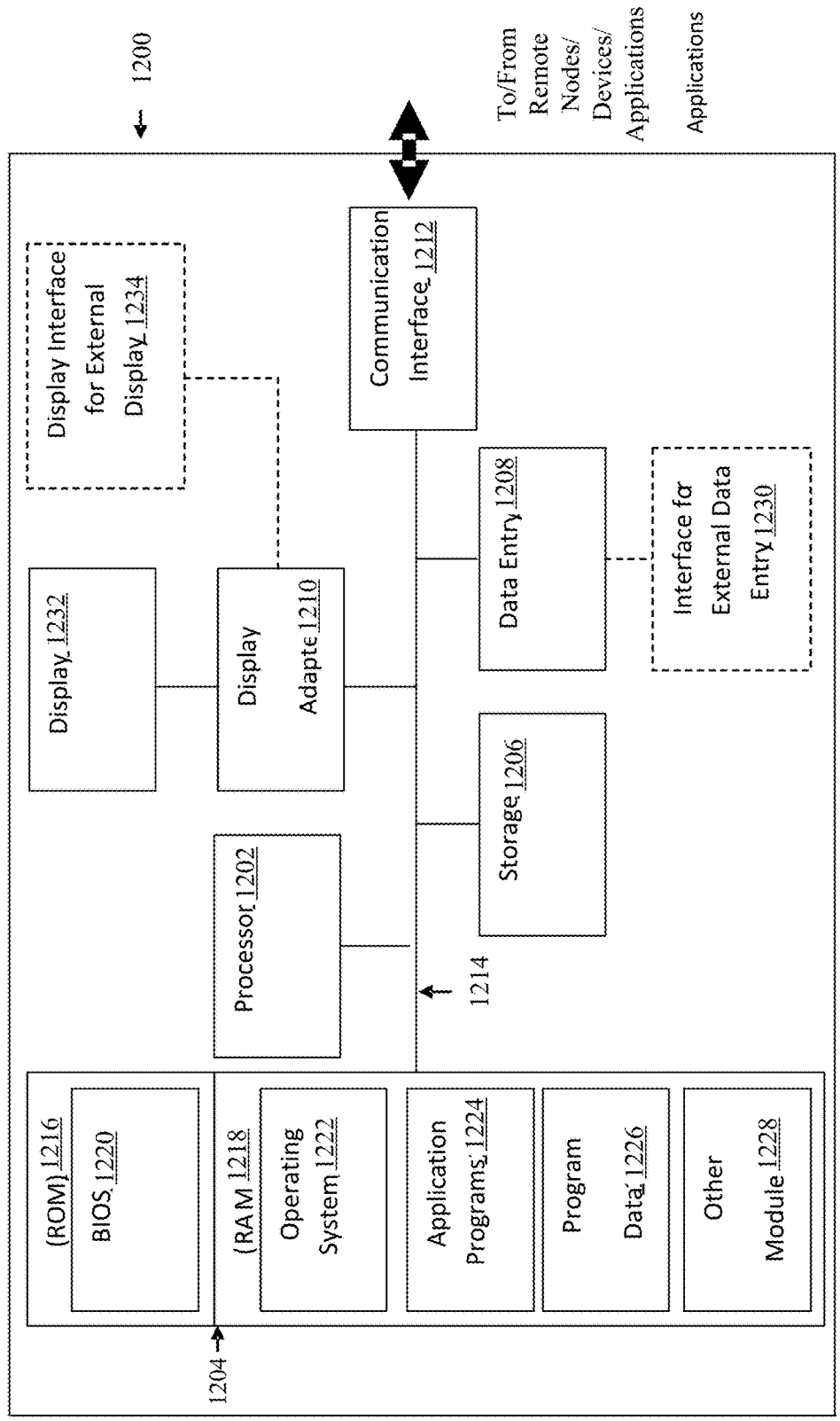
FIG. 12 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 12 may vary depending on the system implementation. With reference to FIG. 12, an exemplary system for implementing the subject matter disclosed herein includes a hardware device 1200, including a processing unit 1202, memory 1204, storage 1206, a data entry module 1208, a display adapter 1210, a communication interface 1212, and a bus 1214 that couples the elements 1204-1212 to the processing unit 1202.

The bus 1214 may comprise any type of bus architecture. Examples include a memory bus, a peripheral bus, a local bus, etc. The processing unit 1202 is an instruction execution machine, apparatus, or device and may comprise a microprocessor, a digital signal processor, a graphics processing unit, an application specific integrated circuit (ASIC), a field programmable gate array (FPGA), etc. The processing unit 1202 may be configured to execute program instructions stored in the memory 1204 and/or the storage 1206 and/or received via the data entry module 1208.

The memory 1204 may include read only memory (ROM) 1216 and random access memory (RAM) 1218. The memory 1204 may be configured to store program instructions and data during operation of the hardware device 1200. In various embodiments, the memory 1204 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1204 may also include nonvolatile memory technologies such as nonvolatile flash RAM (NVRAM) or ROM. In some embodiments, it is contemplated that the memory 1204 may include a combination of technologies such as the foregoing, as well as other technologies not specifically mentioned. When the subject matter is implemented in a computer system, a basic input/output system (BIOS) 1220, containing the basic routines that help to transfer information between elements within the computer system, such as during start-up, is stored in the ROM 1216.

The storage 1206 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1200.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1206, the ROM 1216 or the RAM 1218, including an operating system 1222, one or more applications programs 1224, program data 1226, and other program modules 1228. A user may enter commands and information into the hardware device 1200 through the data entry module 1208.

The data entry module 1208 may include mechanisms such as a keyboard, a touch screen, a pointing device, etc. Other external input devices (not shown) are connected to the hardware device 1200 via an external data entry interface 1230. By way of example and not limitation, external input devices may include a microphone, joystick, game pad, satellite dish, scanner, or the like. In some embodiments, external input devices may include video or audio input devices such as a video camera, a still camera, etc. The data entry module 1208 may be configured to receive input from one or more users of the hardware device 1200 and to deliver such input to the processing unit 1202 and/or the memory 1204 via the bus 1214.

A display 1232 is also connected to the bus 1214 via the display adapter 1210. The display 1232 may be configured to display output of the hardware device 1200 to one or more users. In some embodiments, a given device such as a touch screen, for example, may function as both the data entry module 1208 and the display 1232. External display devices may also be connected to the bus 1214 via an external display interface 1234. Other peripheral output devices, not shown, such as speakers and printers, may be connected to the hardware device 1200.

The hardware device 1200 may operate in a networked environment using logical connections to one or more remote nodes (not shown) via the communication interface 1212. The remote node may be another computer, a server, a router, a peer device or other common network node, and typically includes many or all of the elements described above relative to the hardware device 1200. The communication interface 1212 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1212 may include logic configured to support direct memory access (DMA) transfers between the memory 1204 and other devices.

In a networked environment, program modules depicted relative to the hardware device 1200, or portions thereof, may be stored in a remote storage device, such as, for example, on a server. It will be appreciated that other hardware and/or software to establish a communications link between the hardware device 1200 and other devices may be used.

It should be understood that the arrangement of the hardware device 1200 illustrated in FIG. 12 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 1200.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 12.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for qualified web application security based on multi-layer evaluation of web application hierarchy, the system comprising:
    a processor-based application, which when executed on a computer, will cause the processor to:
    receive by a server, a web application login request from a web browser associated with a user device;
    identify, by the server, a server portion of qualified user information associated with the user device;
    create, by the server, an executable file based on the server using the server portion of the qualified user information to evaluate a web application hierarchy file comprising a plurality of hierarchical nodes, wherein each of the plurality of hierarchical nodes is associated with a corresponding web application function, at least one corresponding business rule, and a corresponding scope-based security configuration;
    receive, by the server, an additional scope-based security configuration;
    insert, by the server, the additional scope-based security configuration into a corresponding node of the plurality of hierarchical nodes in the web application hierarchy file; and
    send, by the server, the executable file to the web browser, thereby enabling the web browser to use a browser portion of the qualified user information to evaluate the executable file and to execute the evaluated executable file to provide qualified web application security for web application access requests from the user device, the browser portion of the qualified user information being independent of the server portion of the qualified user information used by the server for creating the executable file.

2. The system of claim 1, wherein the qualified user information is based on at least two of a user role, a subscription, the user device, a geographic location associated with the user device, a user profile, a time of an access request, a version of the web application, a client-server environment, a user-requested functionality, a service agreement, and a tenant associated with a multi-tenant database system.

3. The system of claim 1, wherein creating, by the server, the executable file comprises creating, by the server, a qualified web application hierarchy file based on the server portion of the qualified user information and creating the executable file is based on the qualified web application hierarchy file.

4. The system of claim 1, wherein providing qualified web application security for web application access requests from the user device comprises disabling access to a child node associated with the web application hierarchy the in response to a determination that access is disabled to an ancestor node associated with the child node.

5. The system of claim 1, wherein the processor-based application is further configured to receive, by the server, the web application hierarchy file from a system administrator.

6. The system of claim 1, wherein the processor-based application is further configured to:
    receive, by the server, an additional hierarchical node from a system administrator; and
    insert, by the server, the additional hierarchical node into the plurality of hierarchical nodes in the web application hierarchy file.

7. A computer-implemented method for qualified web application security based on multi-layered evaluation of web application hierarchy, the method comprising:
    receiving, by a server, a web application login request from a web browser associated with a user device;
    identifying, by the server, a server portion of qualified user information associated with the user device;
    creating, by the server, an executable file based on the server using the server portion of the qualified user information to evaluate a web application hierarchy file comprising a plurality of hierarchical nodes, wherein each of the plurality of hierarchical nodes is associated with a corresponding web application function, at least one corresponding business rule, and a corresponding scope-based security configuration;

receiving, by the server, an additional scope-based security configuration;

inserting, by the server, the additional scope-based security configuration into a corresponding node of the plurality of hierarchical nodes in the web application hierarchy file; and sending, by the server, the executable file to the web browser, thereby enabling the web browser to use a browser portion of the qualified user information to evaluate the executable file and to execute the evaluated executable the to provide qualified web application security for web application access requests from the user device, the browser portion of the qualified user information being independent of the server portion of the qualified user information used by the server for creating the executable file.

8. The method of claim 7, wherein the qualified user information is based on at least two of a user role, a subscription, the user device, a geographic location associated with the user device, a user profile, a time of an access request, a version of the web application, a client-server environment, a user-requested functionality, a service agreement, and a tenant associated with a multi-tenant database system.

9. The method of claim 7, wherein creating, by the server, the executable file comprises, by the server, creating a qualified web application hierarchy file based on the server portion of the qualified user information and creating the executable file is based on the qualified web application hierarchy file.

10. The method of claim 7, wherein providing qualified web application security for web application access requests from the user device comprises disabling access to a child node associated with the web application hierarchy the in response to a determination that access is disabled to an ancestor node associated with the child node.

11. The method of claim 7, wherein the method further comprises receiving, by the server, the web application hierarchy file from a system administrator.

12. The method of claim 7, wherein the method further comprises:
receiving, by the server, an additional hierarchical node from a system administrator; and
inserting, by the server, the additional hierarchical node into the plurality of hierarchical nodes in the web application hierarchy file.

13. A computer program product, comprising a non-transitory computer-readable medium having a computer-readable program code embodied therein to be executed by one or more processors, the program code including instructions to:
receive, by a server, a web application login request from a web browser associated with a user device;
identify, by the server, a server portion of qualified user information associated with the user device;

create, by the server, an executable file based on the server using the server portion of the qualified user information to evaluate a web application hierarchy file comprising a plurality of hierarchical nodes, wherein each of the plurality of hierarchical nodes is associated with a corresponding web application function, at least one corresponding business rule, and a corresponding scope-based security configuration;

receive, by the server, an additional scope-based security configuration;

insert, by the server, the additional scope-based security configuration into a corresponding node of the plurality of hierarchical nodes in the web application hierarchy file; and send, by the server, the executable file to the web browser, thereby enabling the web browser to use a browser portion of the qualified user information to evaluate the executable file and to execute the evaluated executable file to provide qualified web application security for web application access requests from the user device, the browser portion of the qualified user information being independent of the server portion of the qualified user information used by the server for creating the executable file.

14. The computer program product of claim 13, wherein the qualified user information is based on at least two of a user role, a subscription, the user device, a geographic location associated with the user device, a user profile, a time of an access request, a version of the web application, a client-server environment, a user-requested functionality, a service agreement, and a tenant associated with a multi-tenant database system.

15. The computer program product of claim 13, wherein creating, by the server, the executable file comprises creating, by the server, a qualified web application hierarchy file based on the server portion of the qualified user information and creating the executable file is based on the qualified web application hierarchy file.

16. The computer program product of claim 13, wherein providing qualified web application security for web application access requests from the user device comprises disabling access to a child node associated with the application hierarchy file in response to a determination that access is disabled to an ancestor node associated with the child node.

17. The computer program product of claim 13, wherein the program code includes further instructions to receive, by the server, the web application hierarchy the from a system administrator.

18. The computer program product of claim 13, wherein the program code includes further instructions to:
receive, by the server, an additional hierarchical node from a system administrator; and
insert the additional hierarchical node into the plurality of hierarchical nodes in the web application hierarchy file.

\* \* \* \* \*